Oct. 2, 1928.
DE WITT C. CONKLING
CLUTCH
Filed Aug. 21, 1926
1,686,226
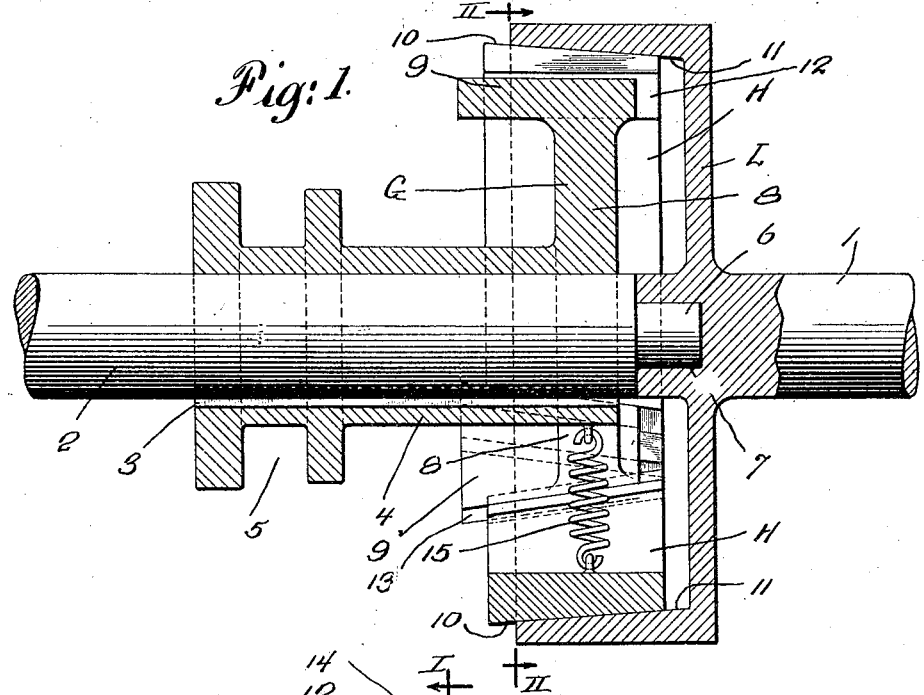
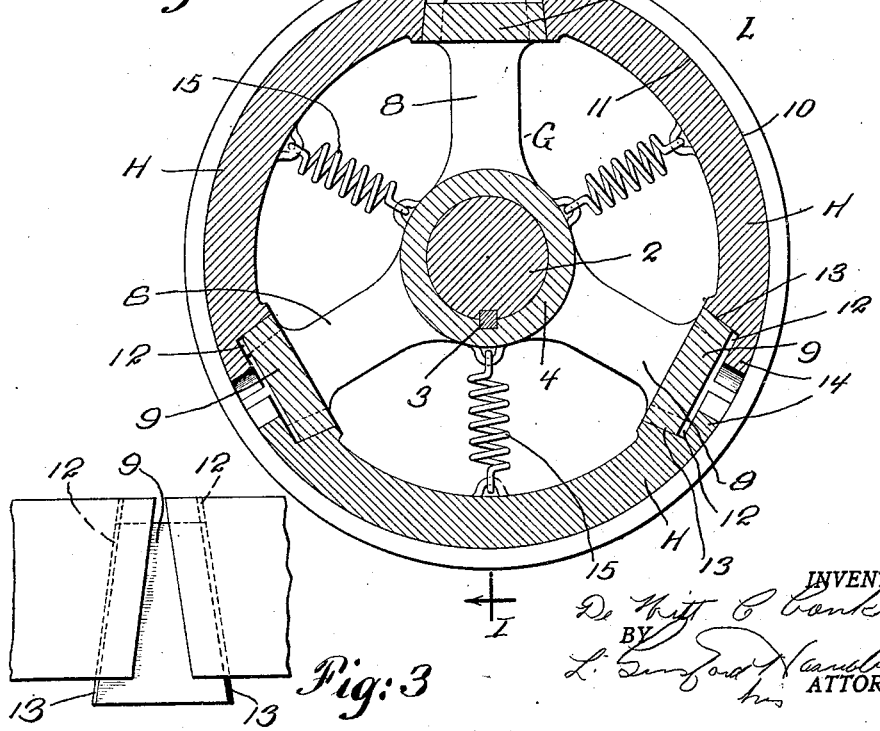

Patented Oct. 2, 1928.

1,686,226

UNITED STATES PATENT OFFICE.

DE WITT C. CONKLING, OF JACKSON HEIGHTS, LONG ISLAND, NEW YORK.

CLUTCH.

Application filed August 21. 1926. Serial No. 130,677.

This invention relates to a clutch, and particularly to a cone type clutch, and an object of the invention is to provide means whereby the efficiency of clutches of this type may be increased.

It is well known that a cone type clutch, while being one of the simplest forms of clutches yet presents certain inherent difficulties as heretofore constructed, namely that if the cone surfaces are made too steep a very great pressure of the two cone members together is required in order to afford a suitable grip between them in many instances, whereas if the cone surfaces are made less steep, in order to reduce the amount of pressure required for attaining a given degree of "grip" then the wedge action of one member into the other produces increased friction and it becomes correspondingly difficult to separate the two members when required.

By the present improvement these difficulties are overcome and it is made possible to utilize a very shallow cone and thereby attain a consequent very powerful grip, and yet be able to release the cone members from each other without difficulty.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:—

Fig. 1 is a longitudinal sectional view through a clutch constructed in accordance with this invention, the section being taken substantially upon the plane of line I—I of Fig. 2.

Fig. 2 is a transverse sectional view taken substantially upon the plane of line II—II of Fig. 1, and Fig. 3 is a fragmentary detail view illustrating a part of the internal clutch member.

Referring to the drawings for describing in detail the exemplary structure therein shown the reference character L indicates what may be conveniently referred to as the external clutch member, the internal clutch member being indicated generally by the reference character G. The member L is mounted upon a drive shaft 1 to turn rigidly therewith and the member G is mounted upon a driven shaft 2 so as to turn therewith but the connection including a longitudinal key as 3 engaging between the shaft and member G whereby the member G is permitted free longitudinal movement along the shaft as will be readily understood.

The clutch member G includes a sleeve portion 4 which surrounds the shaft 2 and which provides an annular groove 5 within which any suitable lever device may engage for moving the clutch member longitudinally of the shaft.

As is customary, the end of the shaft 2 adjacent the shaft 1 is provided with a reduced portion as 6 arranged to rotate within a bearing 7 provided in the end of shaft 1 in order to maintain the shafts in proper concentric alignment at all times.

Provided upon the sleeve 4 is a plurality of rigid radially extending arms as 8—8 within the clutch member L. Three such arms are illustrated in the drawing spaced equidistant, and at their outer ends each is formed with a wedge shaped head 9. Each of these heads is tapered in the direction of length of the shafts and is smallest in the direction of shaft 1.

The clutch member G includes further a plurality of friction members H—H arranged one between each pair of heads 9—9, there being in the present instance three such friction members. These are of segmental form so that collectively they constitute a substantially continuous ring. Their outer surfaces as 10 are inclined so as to conform to and properly fit against the inclined cone surface 11 of the clutch member L.

The opposite ends of each of the friction members H are shaped to provide inclined surfaces as 12—12 arranged to engage against the inclined side surfaces as 13—13 of the wedge shaped heads 9. Suitable portions as 14—14 are provided for overhanging the heads 9 adapted for resting against the outer surfaces of said heads whenever the heads are withdrawn to a proper degree as will be presently apparent.

Suitable tension springs as 15—15 are shown as connecting the friction members respectively with the sleeve portion 4 exerting a constant tendency to urge said friction members in a direction toward said sleeve and away from the surface 11 of clutch member L.

It is particularly pointed out that the cone surfaces 10 and 11 are arranged at a relatively slight incline while the surfaces 12 and 13 are arranged at a relatively great incline, from which fact it will be apparent that although the clutch member G, including its friction members H, may be moved into very great frictional grip against the clutch member L, yet it may be very easily released and withdrawn owing to the great ease with which the steep sided wedges 9 may be withdrawn for permitting radial collapse of the friction members H.

The surfaces 12 and 13 of the wedges and friction members are shown as being slightly tapered radially of the mechanism. The purpose of this is to improve the effect of the heads 9 in directly spreading the friction members H radially against the clutch member L and, inversely, in permitting easy radial collapse of the friction members upon withdrawal of the wedges.

Clutches of the structure herein described may be made of any size and proportions, and the degrees of incline of the main clutch surfaces 10 and 11 as compared with the degrees of incline of the wedge surfaces 12 and 13 may be modified to suit any specified requirements for attaining greater or less gripping power between the main clutch members and greater or less ease of release.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A cone clutch comprising an exterior cone member and an interior cone member, a shaft upon which the interior cone member is carried, said cone members being co-axial with said shaft, the interior cone member comprising a plurality of separately formed segmental friction parts collectively having an exterior cone surface to mate the interior surface of the exterior cone member, said friction parts being arranged end to end and spaced so as to be independently movable with respect to each other, the interior cone member also comprising a plurality of wedges and a carrying member for said wedges by which said wedges are rigidly connected together, and by which said wedges are mounted upon the shaft to move longitudinally of the shaft, said wedges being disposed one between the adjacent ends of each pair of friction parts, the adjacent friction parts having surface portions collectively of wedge shape to mate the surfaces of the wedges, and means by which to operate the wedges against the mentioned surfaces of said friction parts for at once moving said friction parts longitudinally of the shaft with said wedges and spreading the friction parts against the inner surface of the exterior cone member.

2. A cone clutch comprising an exterior cone member and an interior cone member, a shaft upon which the interior cone member is mounted to move longitudinally of the shaft, and said interior cone member comprising a sleeve slidable upon the shaft, said sleeve having a plurality of wedges rigidly connected to move therewith, a plurality of segmental friction parts, and springs interengaging between the friction parts and the sleeve to hold said friction parts in constant engagement with said wedges.

3. A cone clutch comprising an exterior cone member and an interior cone member, a shaft upon which the interior cone member is mounted to move longitudinally of the shaft, and said interior cone member comprising a sleeve slidable upon the shaft, said sleeve having a plurality of wedges rigidly connected to move therewith, a plurality of segmental friction parts, and means for holding said friction parts in constant engagement with said wedges, together with means for moving the sleeve.

4. A cone clutch comprising an exterior cone member and an interior cone member, a shaft upon which the interior cone member is mounted to move longitudinally of the shaft, and said interior cone member comprising as a unitary structure movable longitudinally of the shaft into and out of engagement with the exterior cone member a plurality of segmental friction parts arranged end to end spaced apart and collectively defining an exterior cone surface for mating the interior cone surface of the exterior cone member and a plurality of wedges arranged one intermediate each pair of friction parts together with means normally holding the friction parts to move with the wedges but being yieldable to permit relative movement of the friction parts and wedges.

In testimony whereof I affix my signature.

DE WITT C. CONKLING.